(12) United States Patent
Jogand-Coulomb et al.

(10) Patent No.: US 8,886,760 B2
(45) Date of Patent: Nov. 11, 2014

(54) SYSTEM AND METHOD OF PREDICTIVE DATA ACQUISITION

(75) Inventors: Fabrice Jogand-Coulomb, San Carlos, CA (US); Phillip Jeffrey Balma, Salinas, CA (US); Pascal Achille Caillon, Brooklyn, NY (US); Aviv Alluf, San Jose, CA (US); Brendan Barry Kavanagh, San Jose, CA (US); Kurt Forsyth Webster, Los Gatos, CA (US); Elliot Broadwin, Fremont, CA (US); James Frederick Schram, San Francisco, CA (US); Henry Ricardo Hutton, Tracy, CA (US)

(73) Assignee: Sandisk Technologies Inc., Plano, TX (US)

( * ) Notice: Subject to any disclaimer, the term of this patent is extended or adjusted under 35 U.S.C. 154(b) by 994 days.

(21) Appl. No.: 12/495,342

(22) Filed: Jun. 30, 2009

(65) Prior Publication Data

US 2010/0332586 A1    Dec. 30, 2010

(51) Int. Cl.
*G06F 15/16*    (2006.01)
*H04L 29/08*    (2006.01)

(52) U.S. Cl.
CPC ........... *H04L 67/2847* (2013.01); *H04L 67/306* (2013.01); *H04L 67/04* (2013.01)
USPC ........................................................ 709/219

(58) Field of Classification Search
CPC . H04L 67/28; H04L 67/2842; H04L 67/2847; H04L 67/30
USPC ..................... 709/217–219, 246–247, 52–55; 711/137
See application file for complete search history.

(56) References Cited

U.S. PATENT DOCUMENTS

| | | | |
|---|---|---|---|
| 5,495,591 A * | 2/1996 | Ryan .............................. | 711/213 |
| 5,754,939 A | 5/1998 | Herz et al. | |
| 6,366,912 B1 | 4/2002 | Wallent et al. | |
| 6,499,088 B1 * | 12/2002 | Wexler et al. ................. | 711/152 |
| 6,732,237 B1 * | 5/2004 | Jacobs et al. .................. | 711/119 |

(Continued)

FOREIGN PATENT DOCUMENTS

| | | |
|---|---|---|
| CN | 101375579 A | 2/2009 |
| EP | 0866590 A2 | 9/1998 |

(Continued)

OTHER PUBLICATIONS

International Search Report and Written Opinion received in corresponding PCT Application No. PCT/IL2007/000644 from the International Searching Authority (EPO) mailed Nov. 22, 2007, 18 pages.

(Continued)

*Primary Examiner* — Chirag R Patel
(74) *Attorney, Agent, or Firm* — Toler Law Group, PC

(57) ABSTRACT

Systems and methods of predictive data acquisition are disclosed. A personal proxy server is configured to acquire first data in response to a first request to access the first data and to acquire second data prior to receiving a second request to access the second data. The first request and the second request are received from a common source. The personal proxy server is also configured to store the acquired first data and the acquired second data so that the acquired first data and the acquired second data are accessible to the personal proxy server.

58 Claims, 9 Drawing Sheets

(56) References Cited

U.S. PATENT DOCUMENTS

| | | | |
|---|---|---|---|
| 6,868,439 B2* | 3/2005 | Basu et al. | 709/213 |
| 7,043,524 B2 | 5/2006 | Shah | |
| 7,130,890 B1* | 10/2006 | Kumar et al. | 709/218 |
| 7,155,519 B2 | 12/2006 | Lo et al. | |
| 7,248,861 B2 | 7/2007 | Lazaridis et al. | |
| 7,317,907 B2 | 1/2008 | Linkert et al. | |
| 7,356,591 B2 | 4/2008 | Mousseau et al. | |
| 7,359,933 B1* | 4/2008 | Polen et al. | 709/203 |
| 7,360,027 B2* | 4/2008 | Huggahalli et al. | 711/137 |
| 7,406,332 B1 | 7/2008 | Gaillard et al. | |
| 7,430,633 B2 | 9/2008 | Church et al. | |
| 7,472,247 B2 | 12/2008 | Vitanov et al. | |
| 7,483,871 B2 | 1/2009 | Herz | |
| 7,506,055 B2* | 3/2009 | McClain et al. | 709/225 |
| 7,512,666 B2 | 3/2009 | Zhou | |
| 7,865,468 B2* | 1/2011 | Naineni | 707/636 |
| 7,912,994 B2* | 3/2011 | Cornwell et al. | 710/14 |
| 7,975,025 B1* | 7/2011 | Szabo et al. | 709/218 |
| 2002/0007402 A1* | 1/2002 | Thomas Huston et al. | 709/217 |
| 2002/0046104 A1* | 4/2002 | Kaddeche et al. | 705/14 |
| 2002/0124055 A1* | 9/2002 | Reisman | 709/218 |
| 2002/0138601 A1* | 9/2002 | Piponius et al. | 709/223 |
| 2002/0194434 A1* | 12/2002 | Kurasugi | 711/137 |
| 2003/0009538 A1 | 1/2003 | Shah et al. | |
| 2003/0046412 A1* | 3/2003 | Tsunoda et al. | 709/229 |
| 2003/0126232 A1* | 7/2003 | Mogul et al. | 709/219 |
| 2003/0211861 A1* | 11/2003 | Castrogiovanni et al. | 455/551 |
| 2004/0151192 A1* | 8/2004 | Trossen | 370/401 |
| 2005/0071421 A1* | 3/2005 | Calo et al. | 709/203 |
| 2005/0138143 A1* | 6/2005 | Thompson | 709/218 |
| 2005/0198395 A1* | 9/2005 | Verma et al. | 709/247 |
| 2005/0273514 A1 | 12/2005 | Milkey et al. | |
| 2006/0031584 A1* | 2/2006 | McKinley et al. | 709/246 |
| 2006/0075068 A1 | 4/2006 | Kasriel et al. | |
| 2006/0107062 A1 | 5/2006 | Fauthoux | |
| 2006/0294223 A1 | 12/2006 | Glasgow et al. | |
| 2007/0156845 A1* | 7/2007 | Devanneaux et al. | 709/217 |
| 2007/0165933 A1 | 7/2007 | Thomas et al. | |
| 2007/0185899 A1 | 8/2007 | Ziv et al. | |
| 2007/0220220 A1 | 9/2007 | Ziv et al. | |
| 2007/0276949 A1 | 11/2007 | Mergi et al. | |
| 2008/0005657 A1 | 1/2008 | Sneh | |
| 2008/0068998 A1 | 3/2008 | Jaggi et al. | |
| 2008/0071622 A1* | 3/2008 | Walker et al. | 705/14 |
| 2008/0229072 A1* | 9/2008 | Yamamura et al. | 712/207 |
| 2009/0100228 A1* | 4/2009 | Lepeska et al. | 711/125 |
| 2009/0172274 A1* | 7/2009 | Nochimowski et al. | 711/114 |
| 2009/0172329 A1* | 7/2009 | Paver et al. | 711/163 |
| 2009/0177760 A1* | 7/2009 | Gonzalez et al. | 709/219 |
| 2009/0327529 A1* | 12/2009 | Mardiks | 710/11 |
| 2010/0030792 A1* | 2/2010 | Swinton et al. | 707/100 |
| 2011/0019329 A1* | 1/2011 | Hayumi et al. | 361/160 |
| 2013/0238753 A1* | 9/2013 | Morse et al. | 709/217 |

FOREIGN PATENT DOCUMENTS

| | | | |
|---|---|---|---|
| EP | 1211861 A1 | | 12/2000 |
| EP | 1748608 A1 | * | 1/2007 |
| FR | 2793576 A1 | | 5/1999 |
| GB | 2350973 B1 | | 12/1999 |
| GB | 2349546 A | | 11/2000 |
| KR | 10-2009-0012308 A | | 2/2009 |
| WO | 02060154 A1 | | 8/2002 |
| WO | 02100117 A2 | | 12/2002 |
| WO | 03094474 A1 | | 11/2003 |
| WO | 2007138584 A2 | | 12/2007 |

OTHER PUBLICATIONS

Jiang, Zhimei et al., "Web Prefetching in a Mobile Environment," IEEE Personal Communications, IEEE Communications Society, US, vol. 5, No. 5, Oct. 1998, pp. 25-34.

O'Hare, Gregory et al. "Addressing Mobile HCI Needs Through Agents," Proceedings of the 4th International Symposium on Human Computer Interaction with Mobile Devices and Services (MobileHCI'02), Pisa, Italy, 2002, pp. 311-314. Springer Verlag LNCS 2411.

* cited by examiner

US 8,886,760 B2

SYSTEM AND METHOD OF PREDICTIVE DATA ACQUISITION

FIELD OF THE DISCLOSURE

The present disclosure is generally related to predictive data acquisition.

BACKGROUND

Use of wireless networks to transmit data as well as voice traffic leads to increased loading on such networks. Transmission of content, such as images and video content, to wireless devices adds further loading and strain on network resources and leads to bandwidth limitations. Delivery of broadband data while responding to other data requests from a large number of devices during peak periods adds further loading and costs for network operators. In addition, quality of service for voice and data traffic can be impacted by the increases in wireless data transmissions. Increased bandwidth requirements to support user-initiated broadband data delivery present challenges to network operators, while increased connection latency and network surcharges impact the user experience.

SUMMARY

In view of the foregoing, systems and methods of predictive data acquisition are disclosed. Predictive data acquisition and caching allow optimizing network usage and provide a better user experience. A personal proxy server may acquire and store data after receiving a request to access the data. The personal proxy server may also predictively acquire data prior to receiving a request to access such data. The requests to access the data may originate from a common source, such as an application or a particular user of an accessing device, and the predictively acquired data may be determined based on a profile associated with the common source. The personal proxy server may be implemented at the accessing device, at a removable device attached to the accessing device, or at both devices in a split proxy configuration. The data may be stored or cached at the removable device. The removable device may store the cached data and may store additional data, such as one or more profiles, tracking and metering data, embargoed data, or other information.

DETAILED DESCRIPTION

Figure 1:
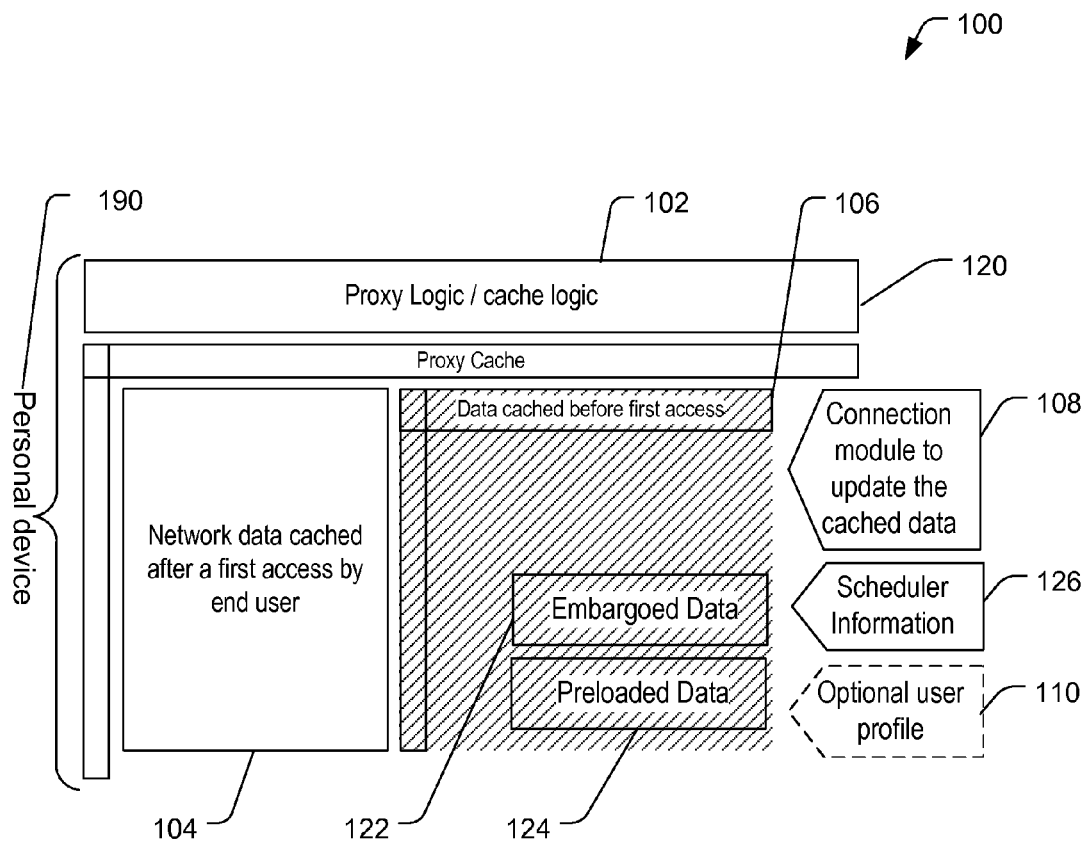
FIG. 1 is a diagram that illustrates components of a predictive data acquisition system according to a particular embodiment.

Referring to FIG. 1, components of a predictive caching system are depicted according to a particular embodiment and generally designated 100. The system 100 includes a personal device 190 that includes proxy logic/cache logic 102 and network data 104 that is cached after a first access by an end user. The personal device 190 also includes data cached before first access 106 and a connection module 108 to update the cached data. The system 100 may optionally include a user profile 110, which may be stored at the personal device 190 or may be stored at a remote server (not shown) accessible to the system 100. The personal device 190 also includes options and extensions such as embargoed data 122, preloaded data 124, and scheduler information 126.

The personal device 190 may be a device such as a mobile phone, a personal digital assistant (PDA), a gaming device, a notebook computer, or any other device that is primarily used by a single user. The proxy logic/cache logic 102 may be configured to function as a personal proxy server for the user of the personal device 190 as opposed to a proxy server shared by multiple users. The personal device 190 may optionally include a removable storage device such as a flash memory device. The removable storage device may store the data cached before first access 106, the embargoed data 122, the preloaded data 124, or any combination thereof The connection module 108 is configured to receive or initiate a connection to update pre-cached data. For example, the connection module 108 may be operable to establish a connection for data transfer over a wireless network, such as a cellular network or other wireless network. In a particular embodiment, the connection module 108 is configured to establish connections with multiple remote sites for data transfer. In another embodiment, the connection module 108 is configured to establish a connection to a remote server (not shown) that retrieves data from the multiple remote sites.

The proxy logic/cache logic 102 is configured to retrieve and update when applicable the network data 104 that is cached after the first access by the end user as well as the data cached before first access 106. For example, the proxy logic/cache logic 102 may fetch an update of part or all of the cached network data 104 or 106 when the requested network data in the cache 104 or 106 has expired or when newer data is available and a connection is available (e.g. when the connection is present and use of the connection is authorized). The data cached before first access 106 may include data that is predictively retrieved based on the user profile 110. The data cached before first access 106 can also include data that is generic for multiple users and not specifically selected for the user of the personal device 190. The network data 104 and the data cached before first access 106 may be stored at a removable storage device (not shown) that is integrated with the personal device 190.

The preloaded data 124 may include data that is stored at the personal device 190 prior to use of the personal device 190 by a particular user. For example, the preloaded data 124 may include data stored for demonstration purposes at a showroom or sales location. The preloaded data 124 may also include advertisements or other promotional data that may be generic for multiple users and not specific to the particular user of the personal device 190.

The embargoed data 122 may include stored data that is not accessible to a user until a predetermined condition is satisfied, such as a current date corresponding with a release date of the embargoed data 122. The embargoed data 122 may enable a service provider to load data to the personal device 190, such as a movie file, during low network traffic periods, and to prevent user access to the embargoed data 122 until a predetermined release date, such as one week prior to the movie release date. The embargoed data 122 is acquired before first access and can also be preloaded on a removable storage device thus allowing distribution before the release date.

The scheduler information 126 may be a scheduler application that runs at the personal device 190. The scheduler information 126 may determine scheduling to retrieve and update the network data 104 and the data cached before first access 106. The scheduling may take into account various parameters, such as an availability of a remote server or content provider or an availability of the network (such as an off-peak traffic period). The scheduling may also take into account a connection type, such as an OverTheAir connection, a Wi-Fi™ connection, a local loop connection, a cable connection, other connection types, or any combination thereof. The scheduling may take into account roaming conditions such as whether the personal device 190 has a roaming status, battery conditions such as a remaining battery charge, or other conditions of the personal device 190. The scheduling may also be based on a personal user credential to access certain web sites, such as to access an email account.

The data cached before first access 106, the embargoed data 122, the preloaded data 124, or any combination thereof, may be stored at a removable storage device (not shown). For example, the removable storage device may be a non-volatile memory device such as a flash memory card. The removable storage device may implement an access control system such as TrustedFlash™. The removable storage device may function as a personal cache that is portable from one device to another and may be populated with multiple versions of content to better suit playback or presentation of the content at each of the various accessing devices. The accessing devices may be external to the removable storage device, and optionally one or more of the accessing devices may be a host device.

During operation, content can be predictively acquired and cached for first time instant access of the content by the user to improve the user experience in Internet access operating environments. In addition, traffic on an operator network may be managed by reducing Internet access at peak times by downloading content during off-peak periods (prefetch). For example, large data transfers may be timed to reduce an impact on voice traffic over a wireless network. Reduced network requirements resulting from predictively caching content during off-peak times may enable reduced cost Internet data access services or subscriptions to individuals or businesses. Cached content may be specifically targeted for a user based on a user profile and may include advertising and promotional data. For example, the cached content may include paid keywords used for auto-completing text entered by the user.

Authenticity of the stored information may be provided by the memory card to prevent write access to unauthorized applications, thus preventing alteration of the data and providing intrusion detection and prevention. The memory card security may also be configured to restrict access to selected content until a predetermined release date. For example, embargoed content can be predictively retrieved and cached but stored in a state that is unavailable for access by the user until the release date of the embargoed content.

Stored content, such as predictively retrieved content or content cached after access by a user, as well as preloaded content, may be stored in multiple formats. A selection of the multiple formats may be made to determine an appropriate format for a particular personal device. In addition, tracking and reporting of advertisements and promotions accessed by or presented to a user may be controlled by the memory card. The memory card may ensure the tracking is genuine and prevent alteration by the user or by a third party.

Figure 2:
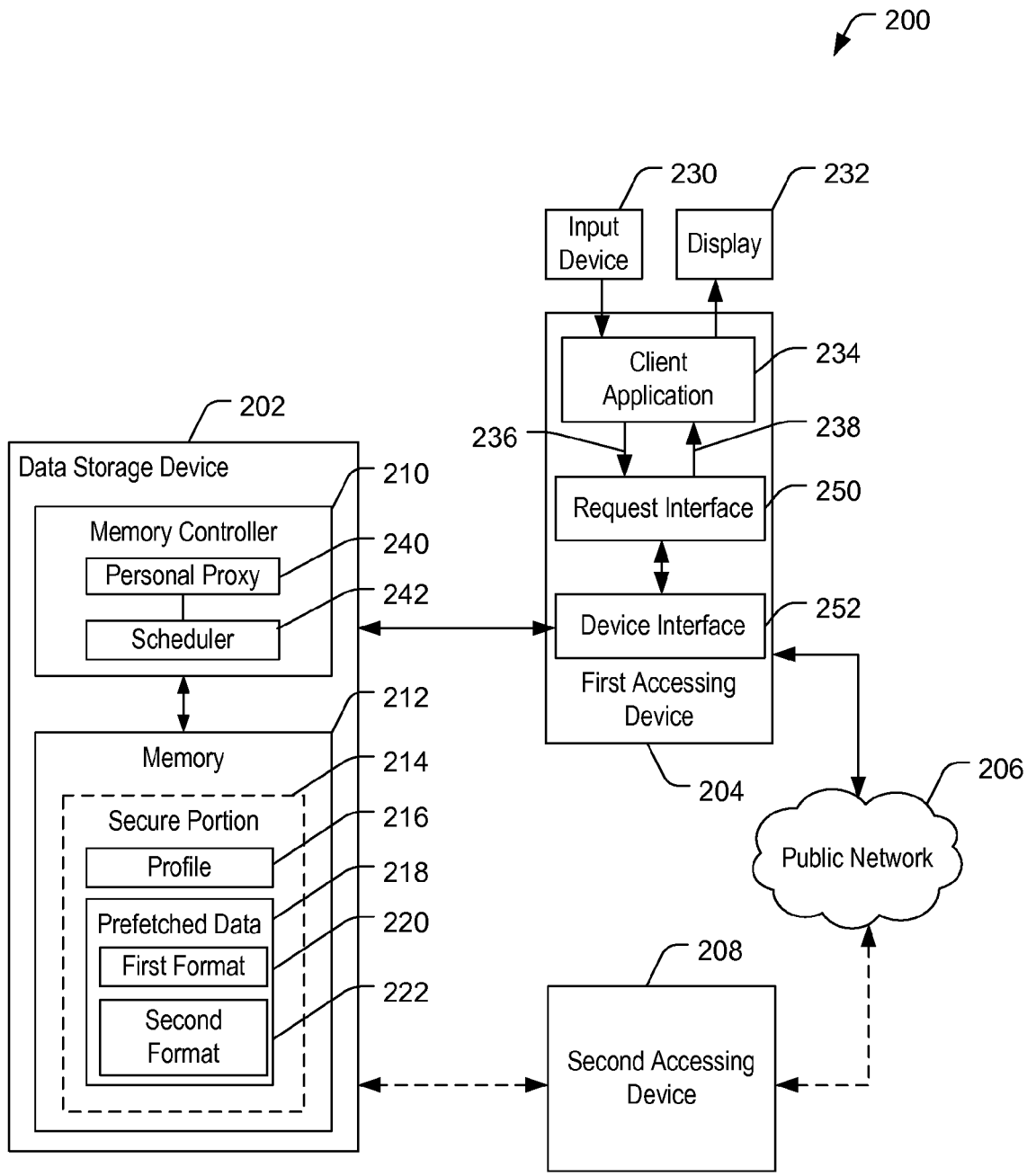
FIG. 2 is a block diagram of a first particular embodiment of a predictive data acquisition system.

Referring to FIG. 2, a system 200 is depicted that includes a data storage device 202 that is removably coupled to a first accessing device 204. The first accessing device 204 is in communication with a public network 206. A second accessing device 208 is operative to be coupled to the data storage device 202 and to the public network 206. The data storage device 202 may operate as a personal cache for a user of the first accessing device 204, the second accessing device 208, or of other accessing devices. The data storage device 202 stores pre-loaded or prefetched content, as well as other personal content and information. The user may switch between use of the data storage device 202 with either of the illustrative accessing devices 204 and 208 or with other accessing devices.

The data storage device 202 includes a memory controller 210 coupled to a memory 212. The memory 212 has a secure portion 214. The secure portion 214 may be implemented as a hidden or special area of the memory 212, an encrypted portion of the memory 212, or both. A profile 216 and prefetched data 218 are stored in the secure portion 214 of the memory 212. The prefetched data 218 includes content stored in a first format 220 and a second format 222. In a particular embodiment, the memory controller 210 is configured to control access to the secure portion 214 of the memory 212, thus controlling data requests of a accessing device that is coupled to the data storage device 202. For example, the memory controller 210 may be configured to provide authentication and authorization protection to enable access by an accessing device, such as the first accessing device 204, to the secure portion 214 of the memory 212.

As illustrated, the memory controller 210 implements a predictive proxy 240 and a scheduler 242. However, in other embodiments the scheduler is external to the data storage device, such as will be described with respect to FIG. 3. In addition, in other embodiments, the scheduler is external to the data storage device but the schedule information and/or the reference of a server to connect to are optionally stored on the removable storage device. The predictive proxy 240 is operative to access the prefetched data 218 from the memory 212 in response to receiving network access requests from a client application 234 at the first accessing device 204. The predictive proxy 240 may be a personal proxy server that is responsive to the client application 234 to access content from the public network 206, such as to retrieve Internet web page content, and to cache retrieved content at the data storage device 202 for a user of the first accessing device 204. The predictive proxy 240 may be configured to track requests for particular types of content from the public network 206 that are made by the client application 234 and to store the requested content at the memory 212 of the data storage device 202. The predictive proxy 240 may further be configured to initiate updates to the data stored at the memory 212 in anticipation of a recurring request for the same content from the client application 234. Thus, the predictive proxy 240 may be operative to initiate data retrieval from the public network 206, to cache the retrieved data at the memory 212, and to update data stored at the memory 212 to be retrievable in response to a request from the client application 234.

Further, the predictive proxy 240 may be configured to receive the profile 216 from the memory 212 and to predictively retrieve or prefetch data from the public network 206 based on the profile 216. The profile 216 may be associated with a common source of data access requests, such as a user, an application such as the client application 234, or a system external to the removable storage device 202. For example, the profile 216 may indicate one or more characteristics or other data relating to a user of the first accessing device 204, such as a preference for a particular type of music or a particular demographic category of the user. The predictive proxy 240 may be operative to initiate requests and to prefetch and store content from the public network 206 to the memory 212 prior to a first requested access of the content by the user of the first accessing device 204. Thus, the predictive proxy 240 may initiate predictive prefetching of data for later access by a user of the first accessing device 204 based on the profile 216.

In a particular embodiment, the scheduler 242 is configured to receive information such as information from the profile 216, data storage times, or data refresh indicators that indicate when an update of the data stored at the memory 212 should occur. The scheduler 242 may be operative to initiate fetching of content from the public network 206 in response to the profile 216 or based on other information stored at the memory 212. The scheduler 242 may instruct the predictive proxy 240 to initiate prefetching of content from the public network 206 and caching of the prefetched content as prefetched data 218 stored at the memory 212 of the data storage device 202. The scheduler 242 may schedule retrieval of content during low traffic periods or in accordance with other quality of service or network management criteria. For example, the scheduler 242 may schedule data retrieval at predetermined intervals or at predetermined times, which may be based on the user's subscription with a wireless service provider providing access to the public network 206.

The first accessing device 204 includes a device interface 252 to enable the first accessing device 204 to communicate with a removable device, such as the data storage device 202. A request interface 250 is configured to receive requests and to forward requests for data access to the predictive proxy 240 via the device interface 252. For example, the device interface 252 can be a universal serial bus (USB) interface, a Secure Digital (SD) card interface, or other interface. The second accessing device 208 may operate in a similar manner as the first accessing device 204. As illustrative, non-limiting examples, the first accessing device 204 or the second accessing device 208 may include a mobile phone, a personal digital assistant, a personal computer, a gaming device, or a multimedia player. As illustrated, the first accessing device 204 and the second accessing device 208 can be external devices that are external to the data storage device 202. Optionally, one or both of the first accessing device 204 or the second accessing device 208 may function as a host device.

A user interface including an input device 230 is coupled to the first accessing device 204 and enables the user of the first accessing device 204 to request data via the client application 234, such as a first request for data and a second request for predictively cached data. For example, the input device 230 may include a touch screen of a portable electronic device, a keyboard, a speech recognition engine coupled to a microphone, a selection and navigation device, other input devices, or any combination thereof A display 232 may be coupled to or embedded within the first accessing device 204 to enable presentation of information and retrieved content to the user of the first accessing device 204. In a particular embodiment, the display 232 may include a screen at the first accessing device 204 or may include an external display that is coupled to the first accessing device 204. The first request for data and the second request for predictively cached data are received via the input device.

In operation, the data storage device 202 may function as a personal proxy cache device that is usable with multiple devices. For example, the data storage device 202 may store the profile 216 along with cached data corresponding to a common source of data requests, such as the user of the data storage device 202. The user of the data storage device 202 may couple the data storage device 202 to the first accessing device 204, such as a personal digital assistant, a mobile telephone, a set-top box, or other type of accessing device. Upon coupling the data storage device 202 to the first accessing device 204, the scheduler 242 may access the profile 216 and other data of the memory 212 and may initiate prefetching of data by the predictive proxy 240 to be cached at the data storage device 202. The prefetching of data may include retrieval of content that the user of the data storage device 202 has previously accessed, such as an update of information at a favorite website, or may include retrieval of content from the public network 206 prior to receiving a request to access at least a portion of the content, such as data retrieved prior to a request from a user of the data storage device 202. For example, content may be prefetched from the public network 206 and cached at the data storage device 202 for the user of the data storage device 202 based on the profile 216 prior to the user of the data storage device 202 requesting the particular content that is prefetched. In addition, advertisements or promotional data (not shown) may be fetched and stored at the data storage device 202 for later retrieval and presentation to the user.

The user of the first accessing device 204 may request particular content using the input device 230. The input device 230 may provide the request for content to the client application 234, which may initiate a request for network data 236 corresponding to the request from the user. The request for network data 236 may be received by the predictive proxy 240 via the device interface 252. The predictive proxy 240 may initiate a retrieval of the requested network data from the prefetched data 218 at the data storage device 202. If the data corresponding to the requested network data is not cached at the data storage device 202, the predictive proxy 240 may initiate a network access to retrieve the data from the public network 206 and then cache the retrieved data at the data storage device 202. After the requested data has been cached at the data storage device 202, the predictive proxy 240 provides the requested data 238 to be sent to the client application 234 via the request interface 250, and the client application 234 may present the requested data 238 via the display 232.

The user may couple the data storage device 202 to a second accessing device 208. For example, the user may remove the data storage device 202 from the first accessing device 204 and may couple the data storage device 202 to the second accessing device 208. As another example, the user may couple the data storage device 202 to the second accessing device 208 without removing the data storage device 202 from the first accessing device 204. To illustrate, the second accessing device 208 may be a personal computer (PC), the first accessing device 204 may be a mobile phone handset that can be coupled to the PC, and the data storage device 202 may be a memory card that remains connected to the mobile phone handset when the handset is coupled to the PC. The second accessing device 208 may be a mobile telephone, a set-top box, a personal computer, or any other device that may be coupled to the data storage device 202. Upon coupling the second accessing device 208 to the data storage device 202, the scheduler 240 and the predictive proxy 242 may initiate prefetching of content in accordance with the profile 216, as described with respect to the first accessing device 204. As a result, the data storage device 202 may act as a portable personal cache for the user, and the data storage device 202 may be inserted into and removed from different accessing devices that the user interacts with. The data storage device 202 may include information including the profile 216 and stored data that has been cached for later access. The stored data may be secured to ensure that access to the personal data and the stored data associated with the common source of data requests, such as the user via the input device 230 or the client application 234, is restricted to only enable access by the common source, as authenticated via the memory controller 210.

When storing user specific information and prefetched data for the user, the data storage device 202 may operate as a removable personal network data device. The predictive proxy 240 can function to predict content that will be accessed by the user and to maintain current copies of data that has been previously accessed. Content retrieval may be scheduled for off-peak times or in accordance with other quality of service or network management criteria.

Figure 3:
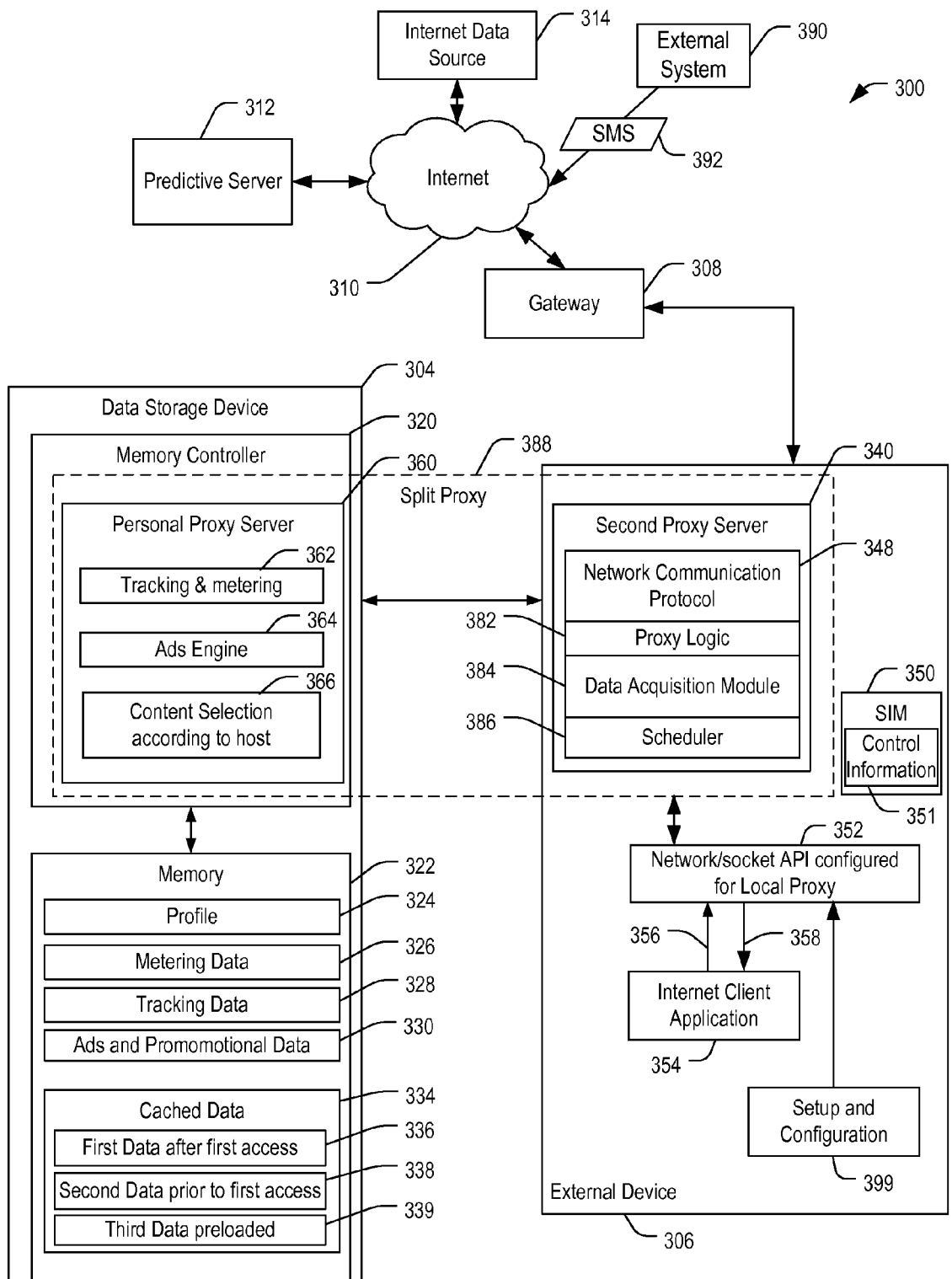
FIG. 3 is a block diagram of a second particular embodiment of a predictive data acquisition system.

Referring to FIG. 3, a system is depicted and generally designated 300. The system 300 includes a data storage device 304 that is coupled to an external device 306. The external device 306 is in communication with an Internet data source 314 via a gateway 308 coupled to a public network, such as the Internet 310. A predictive server 312 may optionally be coupled to the Internet 310.

In a particular embodiment, the data storage device 304 includes a memory controller 320 coupled to a memory 322. The memory 322 stores data accessible to the external device 306 via a split proxy 388 that includes a personal proxy server 360 at the data storage device 304 and a second proxy server 340 at the external device 306. The stored data may include a profile 324, metering data 326, tracking data 328, advertisements and promotional data 330, and cached data 334. The cached data 334 may include first data 336 that is acquired in response to a first request to access the first data 336. The cached data 334 further includes second data 338 (e.g. prefetched data) that is acquired and cached prior to receiving a second request to access at least a portion of the second data 338, and the first request and the second request originate from a common source such as a user of the external device 306, an application, or a system external to the data storage device 304. The cached data 334 also includes preloaded third data 339 that is accessible to the common source via the split proxy 388. The preloaded third data 339 may be written to the memory 322 prior to the data storage device 304 being first coupled to the external device 306. At least a portion of the preloaded third data 339 may include prefetched promotional data that is preloaded to the memory 322 prior to a user preference being stored to the profile 324. The memory controller 320 is configured to enable access by the split proxy 388 to the first data 336, the second data 338, and the preloaded third data 339. The first data 336 and the second data 338 may be exclusively accessible via the personal proxy server 360 of the split proxy 388.

The split proxy 388 is configured to operate as a network proxy sever. Network content access requests originating at the external device 306 are provided to the split proxy 388. The local proxy server 360 determines whether the requested content is stored at the data storage device 304 as cached data 334. If the requested content is not located (or has expired or is no longer valid or authorized), the second proxy server 340 may initiate content retrieval via the gateway 308 and return retrieved data to the personal proxy server 360. The personal proxy server 360 may be responsive to the second proxy server 340 at the external accessing device 306 such as by being configured to store content for the second proxy server 340 or to track access to the acquired first data 336 and the acquired second data 338 by the second proxy server 340. The determination may also use a time stamp to determine if a newer version is available and should be acquired by the proxy 340.

In a particular embodiment, the external device 306 is a portable communication device that executes the second proxy server 340. The second proxy server 340 may include proxy logic 382, a data acquisition module 384, and a scheduler 386. The external device 306 may also include a subscriber identification module (SIM) 350 that may store control information 351. In addition, the external device 306 includes a network/socket application program interface (API) configured for local proxy 352. An Internet client application 354 is configured to send a request 356 for network data via the network/socket API 352 and to receive retrieved data 358 for display to a user of the external device 306. In addition, the network/socket API 352 could be configured to receive setup and configuration information 399. In another embodiment, the setup and configuration information 399 could be located at the data storage device 304, such as stored in the memory 322.

The second proxy server 340 may operate as a portion of the split proxy 388 at the external device 306, which may function as an accessing device. The split proxy 388 is configured to acquire the first data 336 after the common source associated with the profile 324 accesses the first data 336 and is configured to acquire the second data 338 for the common source prior to the common source first accessing the second data 338. The split proxy 388 is further configured to store the first data 336 and the second data 338 to a cache that is accessible to the personal proxy server 360, illustrated as the cached data 334, when the data storage device 304 is coupled to the external device 306.

The split proxy 388 may be configured to predictively acquire the second data 338 based on the profile 324. For example, the profile 324 may include one or more user preferences that are used by the data acquisition module 384 to identify the second data 338, which in turn causes the proxy logic 382 to initiate predictive prefetch of the second data 338 prior to first access by the particular user. For example, the user specified preferences may include at least one page specified by a user of the external device 306. In another embodiment, at least a portion of the second data 338 may be acquired via the predictive server 312 and provided to the split proxy 388 via the gateway 308 to reduce signaling traffic between the external device 306 and the gateway 308.

The split proxy 388 is responsive to the scheduler 386 to acquire the second data 338 at times specified by the scheduler 386. The scheduler 386 may be operative to access the profile 324 to determine a schedule of data retrieval and updating. In addition, the split proxy 388 may be responsive to a short message service (SMS) instruction 392 from an external system 390 to initiate acquiring the first data 336 or acquiring the second data 338. For example, the SMS instruction 392 may be received from a service provider that instructs the split proxy 388 to initiate data acquisition. As a non-limiting example, the SMS instruction 392 may correspond to an instruction to retrieve specified content, such as promotional or advertising content to be cached at the data storage device 304.

The personal proxy server 360 or the second proxy server 340 may implement at least one network communication protocol that is not implemented by the other one of the personal proxy server 360 or the second proxy server 340. For example, the second proxy server 340 includes a network communication protocol module 348 configured to implement a network communication protocol to enable communications via the wireless network connection to the gateway 308, communications via the Internet 310 or other network communications, or any combination thereof. The personal proxy server 360 therefore need not implement one or more of such protocols to enable data retrieval.

The split proxy 388 may also include a tracking and metering module 362, an advertisements engine 364, and can implement content selection 366 according to the external accessing device 306. For example, the content could be selected according to the information included in a hypertext transfer protocol (HTTP) GET provided with the request. The memory controller 320 may be configured to track usage data and store user tracking data. For example, the memory controller 320 may be configured to execute the tracking and metering module 362 as part of the personal proxy server 360 to report user tracking data to a service provider. The user tracking data may correspond to a particular user of the external device 306. The personal proxy server 360 may be configured to perform data metering for billing the particular user. The personal proxy server 360 may be operative to track and meter access to the data that have been cached as if the data had not been cached, i.e., as if data traffic to the external device 306 had occurred. Data tracking and metering may be performed to charge for pre-fetched data only when such data is being accessed. All data being read from the cache can be metered.

In a particular embodiment, the split proxy 388 is configured to prevent the particular user from accessing at least a portion of the second data 338, the third data 339, or both, prior to a predetermined date. For example, the second data 338 may include embargoed data that is prefetched and stored at the memory 322 but is inaccessible to the user until a specified date. Such embargoed data may include movie files, music files, promotions or advertisements corresponding to a particular event or release date, as illustrative examples.

The second data 338 or the third data 339, or both, may include a plurality of advertisements, such as a portion of the advertisements and promotional data 330. The advertisement engine 364 may be configured to select at least one advertisement from the plurality of advertisements for display to the particular user. For example, the advertisements may be loaded to the memory 322 by the split proxy 388 or may be preloaded by a manufacturer or distributor of the data storage device 304. The advertisement engine 364 may select one or more advertisements for display to the particular user based on the profile 324, based on a usage context such as the user initiating, via the Internet client application 354, an Internet search using keywords related to an advertisement, or based on other criteria such as a current date or a user location, as illustrative examples.

During operation, a particular user of the data storage device 304 may couple the data storage device 304 to the external device 306 to enable the split proxy 388 to access the cached data 334 stored for the particular user, application, or external system. The cache 334 may be configured to prevent unauthorized users from accessing protected content that is stored at the cache. The SIM 350 may provide authentication data that may be used by the memory controller 320 to provide access to portions of the memory 322 corresponding to the particular user. The SIM 350 may also store control information 351.

Activation of the personal proxy server 360 may be selectively enabled at least partially based on the control information 351 stored at the SIM 350. The control information 351 may include status information or authentication information, and the activation of personal proxy server 360 and/or the second proxy server 340 may require authentication to the removable data storage device 304. Alternatively, or in addition, an operation of the personal proxy server 360 and/or the second proxy server 340 may be selectively enabled at least partially based on the control information 351. An activity of the split proxy 388 may be restricted based on the control information 351 stored at the SIM 350.

The personal proxy server 360 may access the profile 324 and initiate retrieval of the first data 336 and the second data 338, as initiated or permitted by the scheduler 386, in response to receiving an external signal such as an SMS message, or in response to the request 356 from the Internet client application 354 via the network/socket API 352.

The split proxy 388 may determine, based on the profile 324, that the particular user is predicted to request content from the Internet data source 314. For example, the Internet data source 314 may include content about an upcoming release of a motion picture that matches one or more preferences of the profile 324 or that is predicted to be popular with demographic categories shared by the particular user. The scheduler 386 may schedule retrieval of the predicted content for a specified time or date, such as during a period of low network usage. At the scheduled time, the scheduler 386 may initiate retrieval of the data from the Internet data source 314 via the data acquisition module 384. The retrieved data may be cached at the data storage device 304 and made accessible to the user immediately or after an embargo period.

When the particular user, application, or external system requests content from the Internet data source 314, such as via the Internet client application 354, the split proxy 388 may first access the cached data 334 to attempt to retrieve the requested content from the cache. If the requested content is not cached at the data storage device 304, the split proxy 388 may initiate retrieval of the content from the Internet data source 314 via the gateway 308. The acquired content may be received by the split proxy 388 and added to the first data 336 and stored in the cache 334 for subsequent access by the particular request originator.

Additionally, user tracking and metering may be performed by the tracking and metering engine 362. Data indicating content accessed by the user may be recorded with the tracking data 328, and data representing use of metered content, may be stored with the metering data 326. The tracking data 328, the metering data 326, or a combination thereof, may be communicated to a service provider for user billing based on the user's network activity. Digital rights management (DRM) could also be used to limit the number of times cached content can be accessed.

Although FIG. 3 illustrates the proxy logic 382, the data acquisition module 384, and the scheduler 386 at the second proxy server 340, in other embodiments one or more of the proxy logic 382, the data acquisition module 384, and the scheduler 386 may instead be implemented at the personal proxy server 360 at the data storage device 304.

Figure 4:
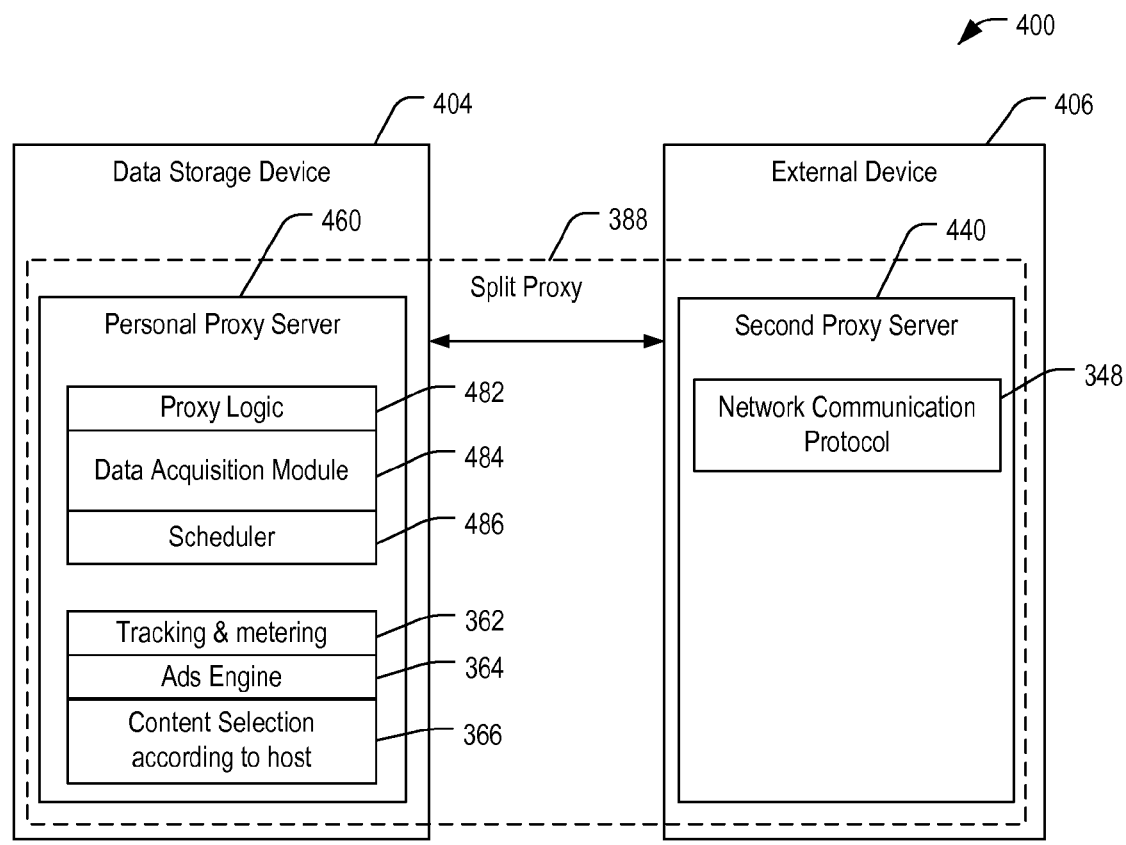
FIG. 4 is a block diagram of a third particular embodiment of a predictive data acquisition system.

For example, FIG. 4 depicts a block diagram of a predictive data acquisition system where the split proxy 388 includes proxy logic 482, a data acquisition module 484, and a scheduler 486 at a personal proxy server 460 at a data storage device 404 rather than at a second proxy server 440 at an external device 406.

The data storage device 404 may correspond to the data storage device 304 of FIG. 3, and the external device 406 may correspond to the external device 306 of FIG. 3. The split proxy 388 may operate in a substantially similar manner as described in FIG. 3, with the personal proxy server 460 including the tracking and metering engine 362, the advertisement engine 364, and the content selection according to the accessing device 366, and with the second proxy server 440 including the network communication protocol 348.

Although the embodiments of the split proxy server 388 depicted in FIG. 3 and FIG. 4 illustrate the proxy logic, the data acquisition module, and the scheduler as implemented at a common device, in other embodiments at least one of the proxy logic, the data acquisition module, and the scheduler may be implemented at a data storage device and at least another of the proxy logic, the data acquisition module, and the scheduler may be implemented at an external device.

Figure 5:
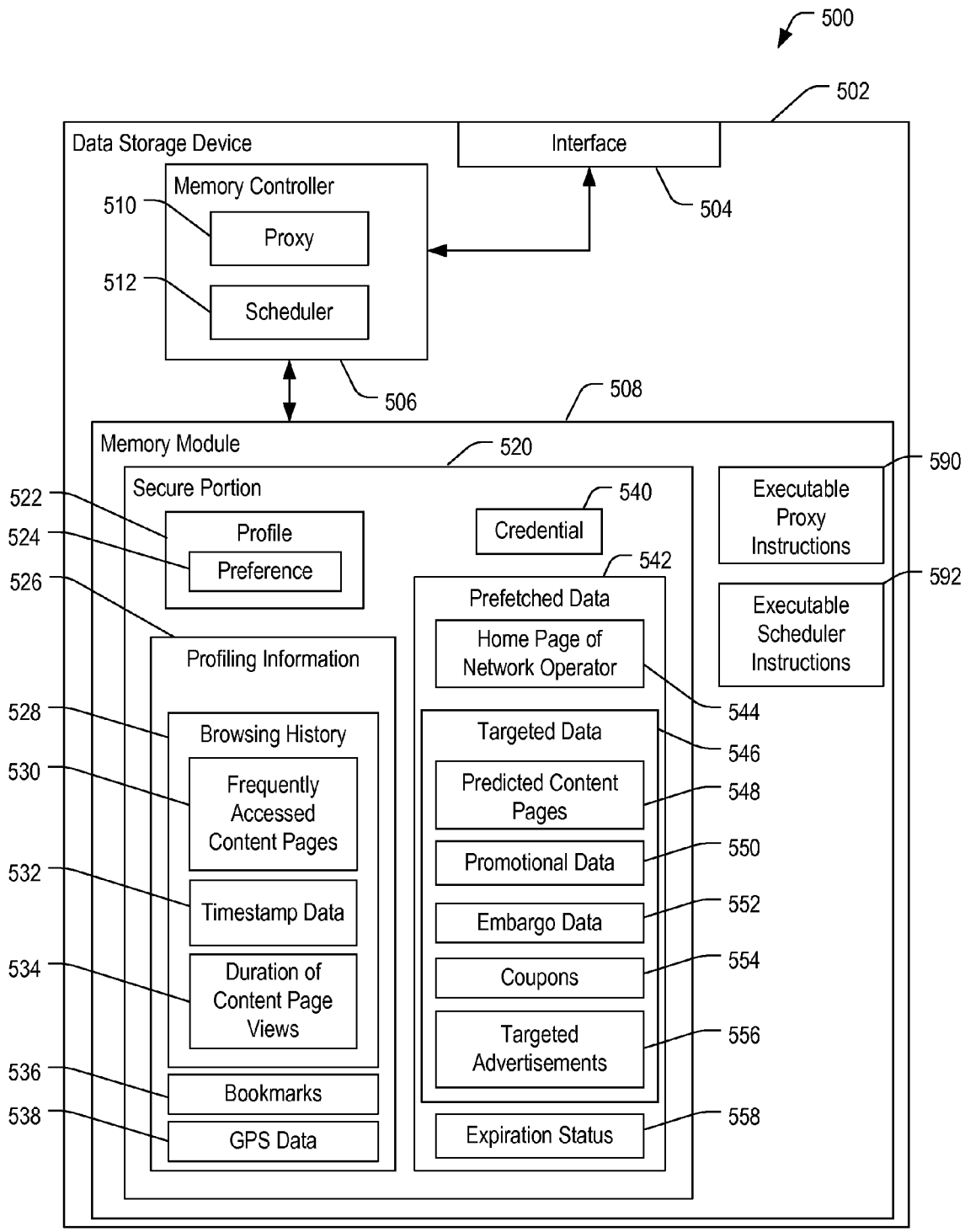
FIG. 5 is a block diagram of a particular embodiment of a data storage device configured to store predictively acquired data.

Referring to FIG. 5, a system including a data storage device configured to store predictively acquired data is depicted and generally designated 500. The system 500 includes a data storage device 502 that may be configured to be removably coupled to an accessing device (not shown). The accessing device may be external to the data storage device 502 and may optionally be a host device. The data storage device 502 includes an interface 504 coupled to a memory controller 506. The memory controller 506 is coupled to a memory module 508. For example, the memory module 508 may be a flash memory.

In a particular embodiment, the memory controller 506 includes a proxy 510, which may be a personal proxy server that is configured to predictively acquire content for a user of the data storage device 502. The memory controller 506 may further include a scheduler 512. The scheduler 512 may be configured to initiate retrieval of information to be stored at the memory module 508. In a particular embodiment, the memory controller 506 supports Internet communication protocols such as Transmission Control Protocol/Internet Protocol (TCP/IP).

The memory module 508 includes a secure portion 520 storing data specific to a particular request originator for data received at the proxy 510. For example, requests may be received from a common source, such as a user, an application, or a system external to the data storage device 502. The memory module 508 further includes executable proxy instructions 590 that are executed at the memory controller 506 to run the proxy 510. The proxy 510 may include logic similar to the proxy logic/cache logic 102 of FIG. 1, the predictive proxy 240 of FIG. 2, the personal proxy server 360 or 460 portion of the split proxy 388 of FIG. 3 or 4, or any combination thereof as illustrative, non-limiting examples. The memory module 508 further includes executable scheduler instructions 592 that are executable at the memory controller 506 to run the scheduler 512.

The secure portion 520 of the memory module 508 includes a profile 522 associated with a request originator, such as a user. The profile 522 includes at least one preference 524. The secure portion 520 of the memory module 508 further includes profiling information 526. The profiling information 526 includes for example a user's browsing history 528. The browsing history 528 may include frequently accessed content pages 530, timestamp data 532, and duration of content page views data 534. In addition, the profiling information 526 may include bookmarks 536 and global positioning system (GPS) data 538. The secure portion 520 of the memory module 508 also includes at least one credential 540. The credential 540 may be associated with a service provider network subscription.

The secure portion 520 of the memory module 508 further includes prefetched data 542. The prefetched data 542 may include pages of a network operator 544 portal that is configured to be provided to a user of the data storage device 502. The prefetched data 542 may also include targeted data 546 that is targeted for use by or for consumption by the request originator. The targeted data 546 may include predicted content pages 548, promotional data 550, embargo data 552, coupons 554, and targeted advertisements 556. In addition, the prefetched data 542 may include expiration status data 558 that may be used to schedule updates of prefetched content.

The memory controller 506 is configured to store the profiling information 526 at the secure portion 520 of the memory module 508. The profiling information 526 is selected from the group consisting of the frequently accessed content pages 530, the timestamp data 532 of content access, the bookmarks 536, the duration of content page views data 534, and the GPS data 538. The memory controller 506 may also be configured to store tracking data, such as the browsing history 528 and the GPS data 538, for promotion and advertising. The memory controller 506 may be configured to report tracking data to a service provider. The memory controller 506 may also be configured to perform data metering for billing a particular request originator using the proxy 510 for data access.

The scheduler 512 may initiate acquisition of the prefetched data 542 by instructing the proxy 510 to predictively retrieve content from a public network for later consumption by a requestor. The prefetched data 542 may include at least a portion of the targeted data 546 that is selected based on the profile 522. The targeted data is selected from the predicted content pages 548 based on the browsing history 528, the promotional data 550, at least one of the coupons 554, and at least one of the targeted advertisements 556.

Figure 6:
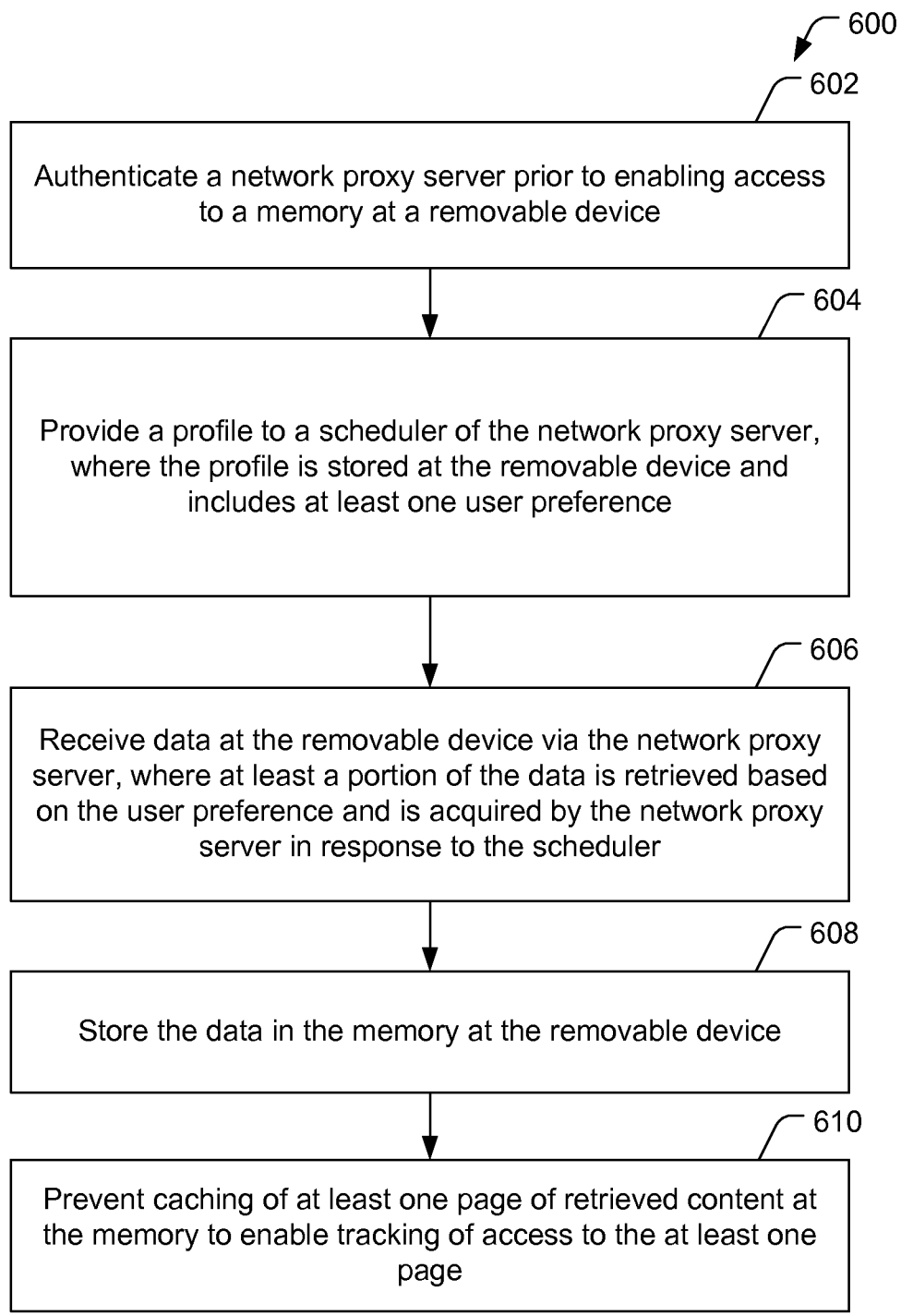
FIG. 6 is a flow diagram of a particular embodiment of a method of predictively acquiring data.

Referring to FIG. 6, a flowchart of a particular embodiment of a method of proxying data is depicted and generally designated 600. As an illustrative example, the method 600 may be performed at a removable data storage device, such as by the memory controller 210 of FIG. 2, the memory controller 320 of FIG. 3, the memory controller 506 of FIG. 5, or any combination thereof.

At 602, the memory device may require the network proxy to authenticate prior to accessing the cached data. For example, the memory controller 210 of FIG. 2 may authenticate the predictive proxy 240 prior to granting access to the secure portion 214 of the memory 212. In addition, or alternatively, an activity of the network proxy server can be restricted based on control information stored at a SIM, such as the control information 351 of FIG. 3. The network proxy server may be a personal proxy server that is configured to predictively acquire content prior to receiving a request for at least a portion of the content. Continuing to 604, a profile is provided to a scheduler of the network proxy server. The profile is stored at the removable device and includes at least one user preference.

Advancing to 606, data is received at the removable device from the network proxy server. At least a portion of the data is retrieved based on a user preference and is acquired by the network proxy server in response to the scheduler. The network proxy server may be configured to intercept a network access request or block network access of a client application at an accessing device and provide the client application with access to the data from the memory instead of retrieving content from a network source. The network proxy server may be configured to retrieve updates to the data in response to the scheduler, and the updates may be received at times that are independent of an expiration status of the received data. For example, the scheduler may update cached data according to bandwidth or other criteria and not according to whether the cached data has an expired status. In a first embodiment, the scheduler may be implemented at the removable device, while in a second embodiment the scheduler may be implemented at an accessing device that is coupled to the removable device.

The data that is received at the removable device may include predictively fetched data to be cached for subsequent access after the data is prefetched prior to a first access by the request originator associated with the profile. As illustrative, non-limiting examples, the prefetched data may include the second data 338 of FIG. 3 or the predicted content pages 548 of FIG. 5.

Moving to 608, the data is stored in a memory at the removable device. The data may include data having a first data format corresponding to a first accessing device and data having a second data format corresponding to a second accessing device. For example, the first data format may be adapted to display content at a display of a mobile device, and the second data format may be adapted to display content at a larger display, such as a display of a personal computer, a notebook computer, or a television.

Proceeding to 610, caching of at least one page of retrieved content at the memory may be prevented to enable tracking of access to the at least one page. For example, where a number of page views of a particular page are to be tracked, the particular page may not be cached at the accessing device so that the content is retrieved from the personal proxy server each time the page is viewed. As a result, individual accesses to the content may be tracked. In contrast, where caching of the page is not prevented, a single access may be tracked while the content may in fact be viewed multiple times from the cache by the requestor.

The method 600 therefore enables predictive fetching and caching of data for access via a network proxy, such as a personal proxy server. Network bandwidth may be managed by scheduling content retrieval for off-peak hours, and anticipated content requests for an individual user may be predicted and performed prior to a first request for the content by the user. Personal data and other data such as preloaded or retrieved advertisement and promotional content may be stored at a removable device for the individual user to use with multiple accessing devices.

Figure 7:
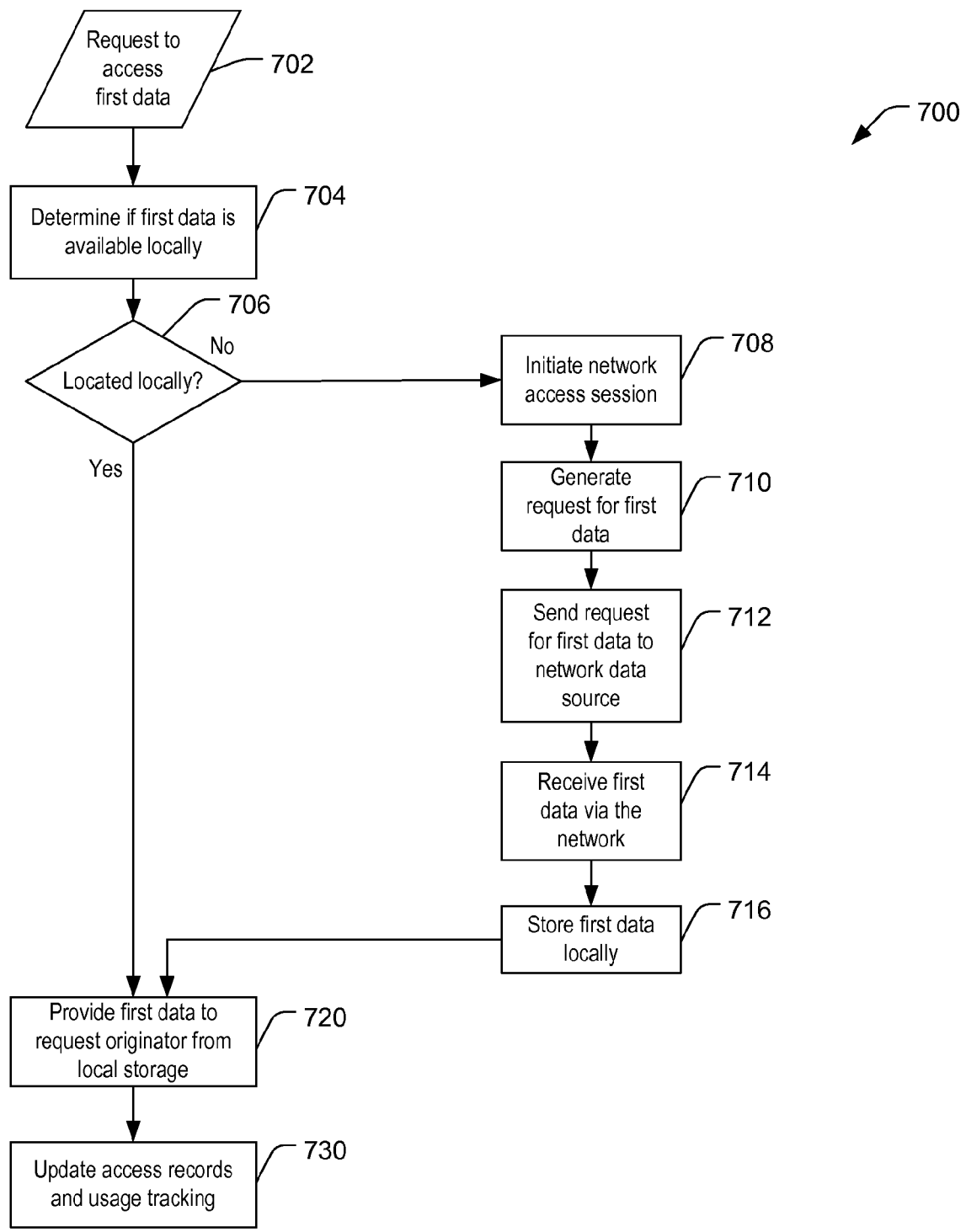
FIG. 7 is a flow diagram of an illustrative embodiment of acquiring first data in response to a request to access the first data.

FIG. 7 is a flow diagram of an illustrative embodiment of acquiring first data in response to a request to access the first data is depicted and generally designated 700. For example, a controller or processing unit may be programmed to execute the acquiring first data operation 700 to support a personal proxy server application that is executable at least partially at the controller or processor. To illustrate, a controller or processor executing the proxy logic/cache logic 102 of FIG. 1, the personal proxy 240 of FIG. 2, the personal proxy server 360 or the second proxy server 340 of FIG. 3, the personal proxy server 460 or the second proxy server 440 of FIG. 4, the proxy 510 of FIG. 5, or any combination thereof, may be permanently or temporarily programmed to execute instructions to perform the operation 700.

In response to receiving a request to access first data 702, a determination is made whether the first data is available locally, at 704. The request to access the first data 702 may originate from a user or application and be received at a proxy server. A local memory or other local storage may be searched for identifiers corresponding to the first data.

When the first data is determined to be stored locally, at decision 706, processing continues with providing the first data to the request originator from local storage, at 720. For example, a read operation may be performed at a local memory and the read result, such as hypertext markup language (HTML) data representing a web page, may be provided to a requesting application, such as a web browser application.

Access records and/or usage tracking may be updated, at 730. For example, a profile record or database corresponding to data access requests of the request generator may be modified to include the request for the first data. In addition, or alternatively, one or more counters may be incremented to indicate an increase in a number of data requests, data consumption events, total data provided, an increase in another count or metric, or any combination thereof.

When the first data is determined not to be stored locally, at decision 706, processing branches to 708 where a network access session is initiated. A request for the first data is generated, at 710. For example, the request may include a hypertext transfer protocol (HTTP) GET command or other network protocol command for data access. The request may be encoded by various encoding techniques including compression encoding, packetizing, error detection coding, modulation coding, other encoding protocol, or any combination thereof. The request may be generated to be at least partially decoded or additionally encoded prior to reaching a data source, such as at one or more gateway servers or network routing devices.

The request for the first data may be sent to a network source, at 712. For example, the network source may be identified via an Internet Protocol (IP) address and the request may be sent as packetized data to the network data source via a wireless wide area network (WWAN) connection to a gateway server, such as the gateway 306 of FIG. 3.

The first data may be received via the network, at 714, and stored locally, at 716. The first data may be provided to the request originator, at 720. Although the process 700 illustrates the first data being stored locally before being provided to the request originator, in other embodiments the first data may be provided to the request originator before or substantially concurrently with storing the first data locally.

Figure 8:
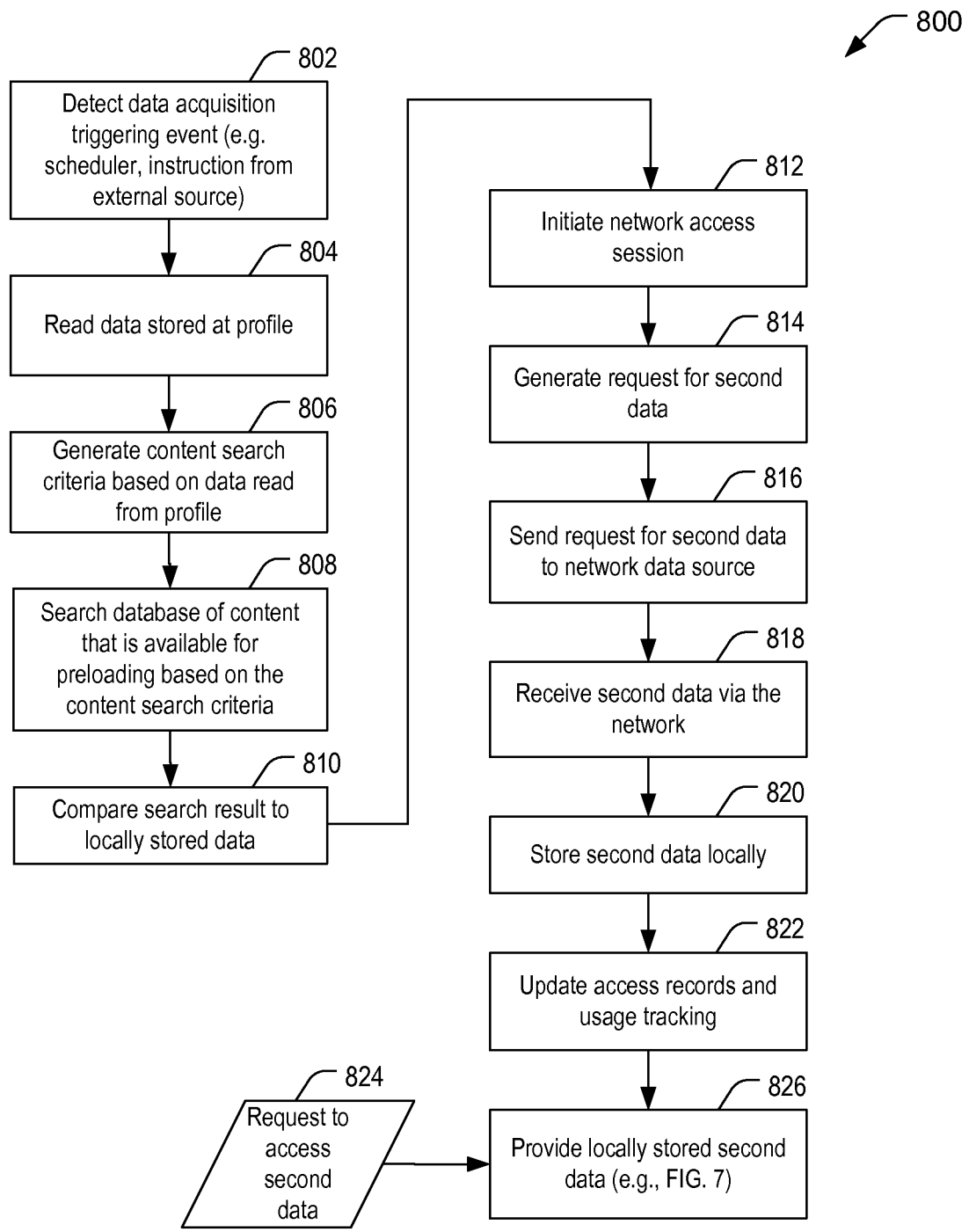
FIG. 8 is a flow diagram of an illustrative embodiment of acquiring second data prior to receiving a request to access the second data.

FIG. 8 is a flow diagram of an illustrative embodiment of acquiring second data prior to receiving a request to access the second data. For example, a controller or processing unit may be programmed to execute the acquiring second data operation 800 to support a personal proxy server application that is executable at least partially at the controller or processor. To illustrate, a controller or processor executing the proxy logic/cache logic 102 of FIG. 1, the personal proxy 240 of FIG. 2, the personal proxy server 360 or the second proxy server 340 of FIG. 3, the personal proxy server 460 or the second proxy server 440 of FIG. 4, the proxy 510 of FIG. 5, or any combination thereof, may be permanently or temporarily programmed to execute instructions to perform the operation 800.

A data acquisition triggering event may be detected, at 802. For example, the data acquisition triggering event may be a command from a scheduler or an instruction from an external source, such as the SMS 392 of FIG. 3. Data stored at a profile is read, at 804. For example, the profile may correspond to a specific user of a personal device. In another embodiment, data stored at a profile corresponding to an application, an external system, or component of a personal device may be read.

Content search criteria is generated based on data read from the profile, at 806. For example, the profile may include data such as user category or preferences, demographic data, location data, historical data requests, keyword search terms previously used, metadata retrieved from prior data accesses, one or more other data types, or any combination thereof.

A database or other collection of content (or other means to determine what content exists) that is available for preloading is searched based on the content search criteria, at 808. The database may be implemented as a list or other collection of available content. The database may be local, such as at the personal device 190 of FIG. 1, or remote, such as at the predictive server 312 of FIG. 3, or may include both local and remote components. A search result may be compared to locally stored data, at 810.

Retrieval and storage of the second data may be similar to the retrieval and storage of the first data described with respect to 708-716 of FIG. 7. A network access session may be initiated, at 812. A request for second data may be generated, at 814. The second data may include data identified via the search result that is not stored locally and that has not been requested by a request originator of a personal proxy server. The request for the second data may be sent to a network data source, at 816. The second data may be received via the network, at 818 and stored locally, at 820. Access records and usage tracking may be updated, at 822.

After storing the second data locally, a request to access the second data 824 may be received. The locally stored second data may be provided to the request originator, at 826. Providing the locally stored second data may be similar to providing the locally stored first data, at 720 of FIG. 7.

Although various components depicted herein are illustrated as block components and described in general terms, such components may include one or more microprocessors, state machines, or other circuits configured to enable the personal device 190 of FIG. 1, the data storage device 202 and/or the accessing device 204 of FIG. 2, the data storage device 304 and/or the external device 306 of FIG. 3, the data storage device 404 and/or external device 406 of FIG. 4, the data storage device 502 of FIG. 5, or any combination thereof, to perform the particular functions attributed to such component. For example, the controller 506, the interface 504, or both, of FIG. 5 may represent physical components, such as hardware controllers, state machines, logic circuits, or other structures to enable the data storage device 502 of FIG. 5 to receive requests incoming from an external device and to predictively cache and provide requested content via the proxy 510.

In a particular embodiment, the data storage device 502 may be a portable device configured to be selectively coupled to one or more external devices. However, in other embodiments, the data storage device 502 may be attached or embedded within one or more accessing devices, such as within a housing of a portable communication device. For example, the data storage device 502 may be within an apparatus such as a wireless telephone, personal digital assistant (PDA), gaming device or console, portable navigation device, or other device that uses internal non-volatile memory. In a particular embodiment, the multimedia storage device 502 includes a non-volatile memory.

Figure 9:
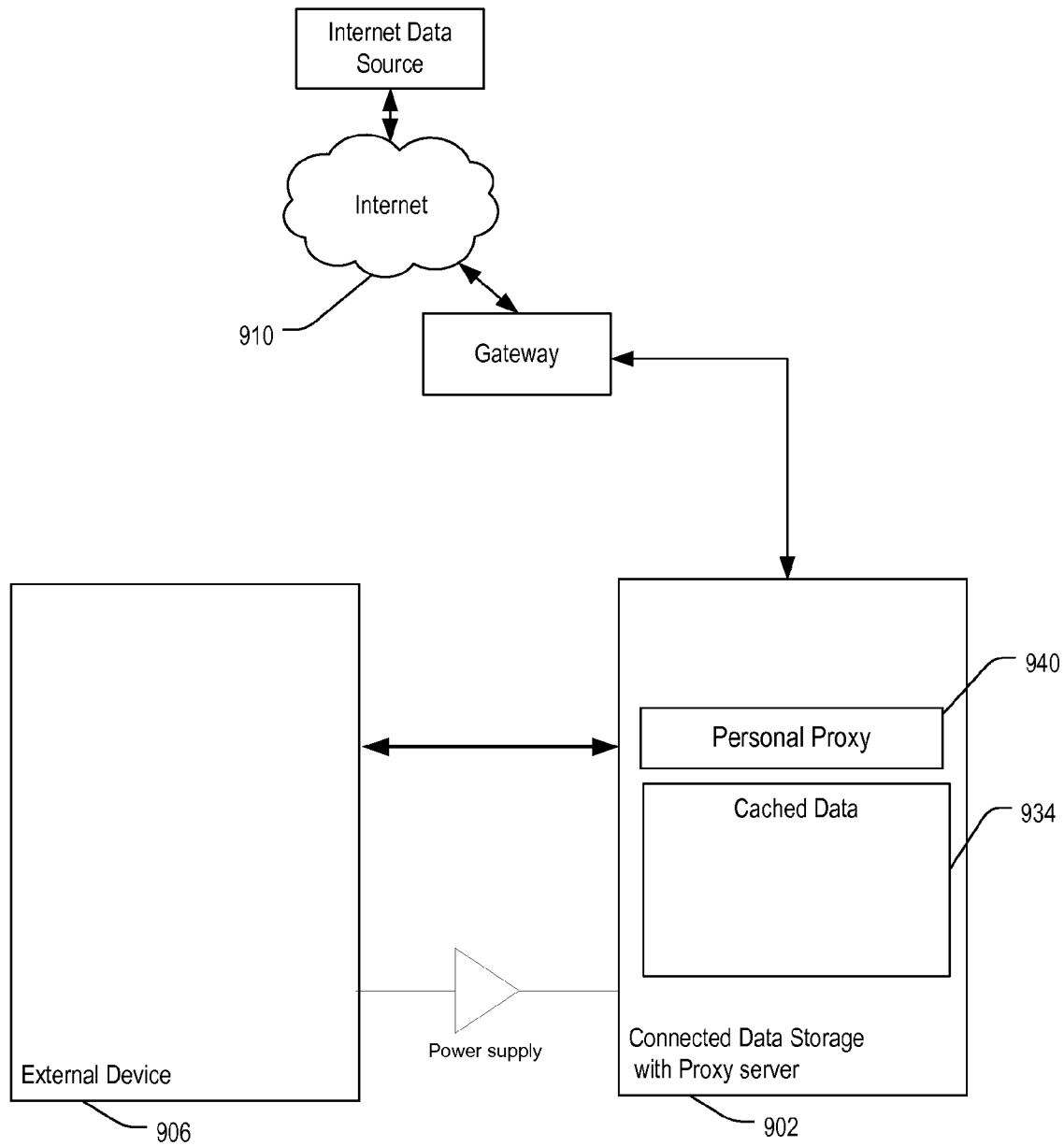
FIG. 9 is a block diagram of a particular embodiment of a connected data storage device with an embedded proxy server

In particular embodiment shown in FIG. 9, the data storage device 902 may be removably connected to the accessing device 906 that also serves as a power supply to the data storage device 902. The data storage device 902 comes with a proxy 940 and serves as a gateway for the external accessing device 906 to access the Internet 910. In some embodiments, the cached data 934 may be stored on a removable memory module inserted in the data storage device 902. The cached data 934 may be protected.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
an interface, wherein the interface is removably coupleable to an access device that is distinct from the apparatus, the apparatus being configured to receive data and power from the access device via the interface;
a controller operatively coupled to the interface, wherein the controller is configured to function as a personal proxy server when the interface is coupled to the access device, wherein the personal proxy server is configured to:
use the access device, via the interface, to acquire first data from a remote source in response to a first request to access the first data, and
use the access device, via the interface, to acquire second data from the remote source prior to receiving a second request to access at least a portion of the second data, the first request and the second request received from an application of the access device, and
a memory coupled to the interface and accessible to the controller, wherein the personal proxy server is further configured to store the acquired first data and the acquired second data at the memory such that the acquired first data and the acquired second data are accessible to the personal proxy server.

2. The apparatus of claim 1, wherein a common source of the first request and the second request includes a user of the access device, the application of the access device, or a computing system remote from the access device.

3. The apparatus of claim 1, wherein the personal proxy server acquires the second data by interacting, via the interface, with proxy server components that execute at the access device.

4. The apparatus of claim 1, wherein a scheduler triggers acquisition of the second data, and wherein the scheduler is operative to access a profile associated with a common source of the first request and the second request.

5. The apparatus of claim 4, wherein the scheduler is implemented at a removable device that includes the interface, the personal proxy server and the memory.

6. The apparatus of claim 1, wherein the personal proxy server is further configured to initiate acquiring the second data responsive to an instruction received from a device that is remote from the access device and remote from the apparatus.

7. The apparatus of claim 6, wherein the instruction to initiate acquiring the second data is received at the access device via a short message service (SMS) message.

8. The apparatus of claim 1, wherein the personal proxy server is configured to acquire the second data based on a profile of a user that initiates the first request and the second request.

9. The apparatus of claim 8 wherein the access device is coupled to a subscriber identification module (SIM), and wherein an identification of the user is determined based on data stored at the SIM.

10. The apparatus of claim 1, wherein the personal proxy server is configured to prevent a user from accessing at least a portion of the acquired second data prior to a predetermined date.

11. The apparatus of claim 1, wherein the second data comprises a plurality of advertisements, and wherein the personal proxy server is further configured to select at least one advertisement from the plurality of advertisements for display at the access device.

12. The apparatus of claim 1, wherein the acquired first data and the acquired second data are exclusively accessible from the memory via the personal proxy server.

13. The apparatus of claim 1, wherein activation of the personal proxy server is selectively enabled based at least partially on control information stored at a subscriber identification module (SIM).

14. The apparatus of claim 13, wherein the control information includes authentication information and wherein the activation of the personal proxy server is enabled responsive to the access device authenticating a removable device based on the authentication information.

15. The apparatus of claim 1, wherein the controller is further configured to:
receive, via the interface from the application executing on the access device, a request for third data;
determine that the third data is not stored in the memory;
send a second request for the third data to a network data source via the interface and the access device;
receive the third data from the network data source via the interface and the access device;
store the third data at the memory; and
provide the third data to the application from the memory via the interface.

16. A host device comprising:
an interface coupleable to a removable device;
a power supply coupled to the interface; and
a first portion of a personal proxy server operatively coupled to the interface, wherein the first portion of the personal proxy server interacts with a second portion of the personal proxy server that is onboard the removable device when power is provided to the removable device via the interface;
wherein the personal proxy server is configured to acquire first data in response to a first request to access the first data,
wherein the personal proxy server is further configured to acquire second data prior to receiving a second request to access at least a portion of the second data, the second request and the first request originating from a common source, and
wherein the personal proxy server is further configured to store the acquired first data and the acquired second data at a memory of the removable device when the removable device is coupled to the interface.

17. The host device of claim 16, wherein the common source is a user, and wherein the personal proxy server is configured to acquire the second data based on a profile associated with the user.

18. The host device of claim 17, wherein the profile is stored at the memory of the removable device.

19. The host device of claim 16, wherein the personal proxy server includes a scheduler that schedules acquisition of the second data.

20. The host device of claim 16, wherein the personal proxy server is configured to prevent the common source from accessing at least a portion of the acquired second data from the memory prior to receiving an instruction to make the portion of the acquired second data accessible, wherein the instruction is received from an external system that is distinct from the host device and distinct from the removable device.

21. The host device of claim 16, wherein the removable device stores preloaded third data that is accessible via the personal proxy server, wherein the preloaded third data is written to the removable device prior to the removable device being first coupled to the interface.

22. The host device of claim 16, further comprising a user interface including an input device, wherein the first request and the second request are received via the input device.

23. The host device of claim 16, further comprising a subscriber identification module (SIM) storing control information, and wherein an operation of the personal proxy server is restricted at least partially based on the control information.

24. The host device of claim 16, wherein the second data is prefetch data and wherein the personal proxy server retrieves the prefetch data at particular times based on a user's subscription with a wireless service provider.

25. A removable device comprising:
a housing;
an interface coupleable to an access device that is external to the housing, wherein the interface enables the removable device to receive power and data to be cached from the access device;
a memory controller within the housing and operatively coupled to the interface, the memory controller configured to function as a personal proxy server that is configured to acquire first data via the access device in response to a first request to access the first data, wherein the personal proxy server is further configured to acquire second data via the access device prior to receiving a second request to access at least a portion of the second data, the second request and the first request received from an application of the access device; and
a memory within the housing and coupled to the memory controller, the memory operative to store the acquired first data and the acquired second data.

26. The removable device of claim 25, wherein the personal proxy server is responsive to a second proxy server of the access device.

27. The removable device of claim 26, wherein the personal proxy server is configured to store content for the second proxy server at the memory.

28. The removable device of claim 26, wherein the personal proxy server is configured to track access to the acquired first data and to the acquired second data by the second proxy server.

29. The removable device of claim 28, wherein the personal proxy server or the second proxy server implements at least one network communication protocol that is not implemented by the other one of the personal proxy server or the second proxy server.

30. The removable device of claim 25, wherein the personal proxy server is further configured to store profile information at a secure portion of the memory, the profile information indicating at least one of user specified preferences, frequently accessed content pages, timestamp data of content access, bookmarks, duration of content page views, and global positioning system (GPS) data.

31. The removable device of claim 30, wherein the user specified preferences include at least one page specified by a user of the access device.

32. The removable device of claim 25, wherein the memory controller is further configured to track usage data and store user tracking data.

33. The removable device of claim 32, wherein the memory controller is further configured to report the user tracking data to a service provider, the user tracking data corresponding to a particular user of the access device.

34. The removable device of claim 25, wherein the personal proxy server is further configured to perform data metering for billing a user of the access device.

35. The removable device of claim 34, wherein the user is not charged for the access device acquiring the second data unless the user requests access to the second data.

36. The removable device of claim 25, wherein the memory controller is further configured to provide the second data to the access device from the memory in response to the application providing the second request.

37. The removable device of claim 36, wherein the memory controller is further configured to provide the second data to a second access device from the memory when the interface is coupled to the second device and in response to a second application of the second access device providing a third request to access the second data.

38. A removable data storage device comprising:
a housing;
an interface coupleable to an access device that is external to the housing, wherein the interface enables the removable data storage device to receive power and data to be cached from the access device;
a memory within the housing, the memory operative to store a profile and to store prefetched data that is accessible to an application of the access device via a personal proxy server when the interface is coupled to the access device; and
a memory controller within the housing, coupled to the memory and coupled to the interface, wherein the memory controller is configured to implement a scheduler, and wherein the scheduler is operative to initiate acquisition of the prefetched data, via the access device, for the personal proxy server in accordance with the profile.

39. The removable data storage device of claim 38, wherein the memory controller is configured to store the prefetched data in a secure portion of the memory.

40. The removable data storage device of claim 38, wherein the personal proxy server comprises:
a first proxy server that is executable at the memory controller to provide cached data to the application of the access device via the interface; and
a second proxy server that is executable at the access device to retrieve the prefetched data via a network connection of the access device and to provide the prefetched data to the memory controller via the interface.

41. The removable data storage device of claim 38, wherein the personal proxy server is operative to access the prefetched data from the memory in response to receiving a network access request from a client application of the access device.

42. The removable data storage device of claim 38, wherein tracking data corresponding to a particular user of the access device is stored in a secure portion of the memory.

43. The removable data storage device of claim 38, wherein the memory controller is further configured to store profile information at a secure portion of the memory, the profile information specifying at least one of user specified preferences, frequently accessed content pages, timestamp data of content access, bookmarks, duration of content page views, and global positioning data.

44. The removable data storage device of claim 38, wherein a credential associated with a service provider network subscription is stored at a secure portion of the memory.

45. The removable data storage device of claim 38, wherein the scheduler initiates acquisition of the prefetched data by instructing the personal proxy server to predictively retrieve content from a public network for later consumption by a user of the access device.

46. The removable data storage device of claim 45, wherein the scheduler initiates the acquisition of the prefetched data based on a roaming condition of the access device.

47. The removable data storage device of claim 38, wherein the scheduler initiates the acquisition of the prefetched data based on a battery condition of the access device.

48. The removable data storage device of claim 38, wherein the memory controller restricts the personal proxy server from accessing the prefetched data prior to authenticating the personal proxy server.

49. The removable data storage device of claim 48, wherein at least a portion of the prefetched data includes promotional data that is preloaded to the memory prior to a user preference being stored to the profile.

50. A method comprising:
accessing a user profile from a memory of a removable device, wherein the user profile specifies at least one user preference;
sending the user profile to a scheduler of a network proxy server;
receiving data at the removable device via the network proxy server and via an external device to which the removable device is coupled, wherein at least a portion of the data is retrieved based on the at least one user preference and is acquired by the network proxy server in response to the scheduler; and
storing the received data in the memory at the removable device;
wherein the network proxy server is configured to receive a network access request from a client application executing at the external device and to provide the client application with access to the data from the memory of the removable device in response to the network access request.

51. The method of claim 50, wherein the scheduler is implemented at a memory controller of the removable device.

52. The method of claim 50, wherein the scheduler is implemented at the external device that is coupled to the removable device.

53. The method of claim 50, wherein the network proxy server is configured to retrieve updates to the data in response to the scheduler, wherein the updates are retrieved based on a bandwidth criteria.

54. The method of claim 50, wherein the received data comprises data having a first data format corresponding to the external device and data having a second data format corresponding to a second external device to which the removable device is coupleable.

55. The method of claim 50, further comprising preventing caching of at least one page of retrieved content at the memory to enable tracking of access to the at least one page.

56. The method of claim 50, wherein a memory controller of the removable device authenticates the network proxy server prior to enabling the network proxy server to access the data from the memory.

57. The method of claim 50, wherein an activity of the network proxy server is restricted based on control information stored at a subscriber identification module (SIM) coupled to the external device.

58. The method of claim 50, further comprising:
receiving an access request from the network proxy server, the access request generated by the client application and requesting second data;
determining that the second data is not stored in the memory of the removable device;
sending a request for the second data to a network data source via the external device;
receiving the second data from the network data source via the external device;
storing the second data at the memory of the removable device; and
providing the second data to the client application from the memory of the removable device via the network proxy server.

* * * * *